United States Patent
Murakami

(10) Patent No.: US 11,025,790 B2
(45) Date of Patent: Jun. 1, 2021

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventor: Takashi Murakami, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/385,686

(22) Filed: Apr. 16, 2019

(65) Prior Publication Data

US 2019/0245993 A1 Aug. 8, 2019

Related U.S. Application Data

(63) Continuation of application No. 15/441,691, filed on Feb. 24, 2017, now abandoned.

(30) Foreign Application Priority Data

Aug. 9, 2016 (JP) .................................. 2016-156390

(51) Int. Cl.
*H04N 1/00* (2006.01)

(52) U.S. Cl.
CPC ..... *H04N 1/00506* (2013.01); *H04N 1/00411* (2013.01); *H04N 1/00442* (2013.01); *H04N 1/00458* (2013.01); *H04N 2201/0094* (2013.01)

(58) Field of Classification Search
None
See application file for complete search history.

(56) References Cited

U.S. PATENT DOCUMENTS

| 9,467,848 | B1 | 10/2016 | Song et al. |
| 9,785,307 | B1 | 10/2017 | Ganesan et al. |
| 2010/0295789 | A1* | 11/2010 | Shin .................... G06F 3/04847 345/168 |
| 2013/0148157 | A1* | 6/2013 | Matsuura ............... G06F 3/1204 358/1.15 |
| 2013/0201534 | A1 | 8/2013 | Carlen et al. |
| 2015/0281478 | A1 | 10/2015 | Okamoto |

(Continued)

FOREIGN PATENT DOCUMENTS

| JP | 4759038 B2 | 8/2011 |
| JP | 2012-18601 A | 1/2012 |

(Continued)

OTHER PUBLICATIONS

Jan. 28, 2020 Office Action issued in Japanese Patent Application No. 2016-156390.

(Continued)

*Primary Examiner* — Fan Zhang
(74) *Attorney, Agent, or Firm* — Oliff PLC

(57) ABSTRACT

An image forming apparatus includes a display and a processor that is programmed to perform control to display multiple document-addition display components that are formed on the display together with all or some of reduced images of pages included in a first document. Each of the multiple document-addition display components is formed between adjacent ones of the reduced images of pages included in the first document. The multiple document-addition display components are operated by a user to add a second document to the first document.

9 Claims, 3 Drawing Sheets

(56) References Cited

U.S. PATENT DOCUMENTS

2015/0378644 A1  12/2015  Asai
2017/0200473 A1   7/2017  Moore et al.

FOREIGN PATENT DOCUMENTS

JP   2015-198288 A   11/2015
JP   2016-103137 A    6/2016

OTHER PUBLICATIONS

Mar. 2020 Office Action issued in Chinese Patent Application No. 201710269571.9.
Sep. 22, 2020 Office Action issued in Chinese Patent Application No. 2017102695719.
Aug. 11, 2020 Office Action issued in Japanese Patent Application No. 2016-156390.
Mar. 26, 2021 Office Action issued in Chinese Patent Application No. 201710269571.9.

* cited by examiner

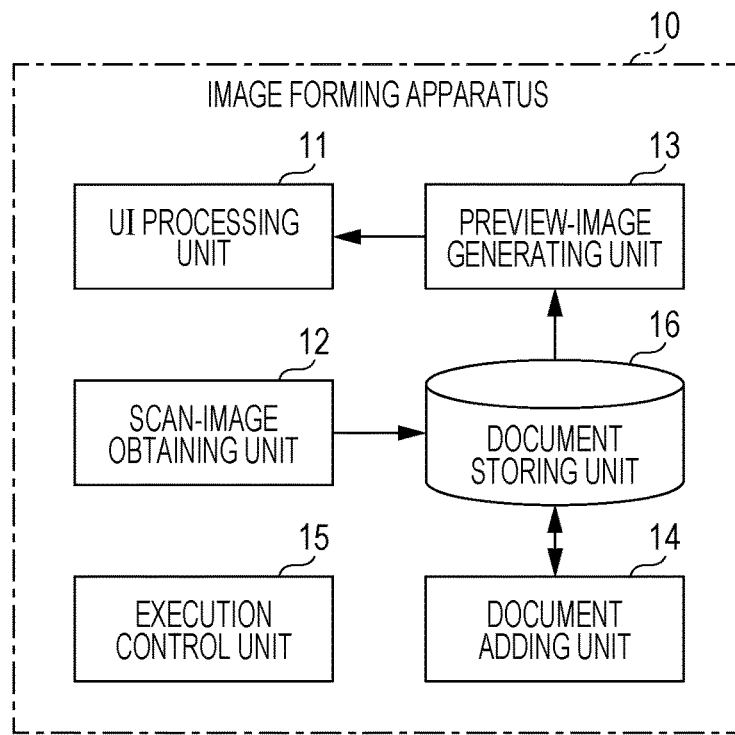
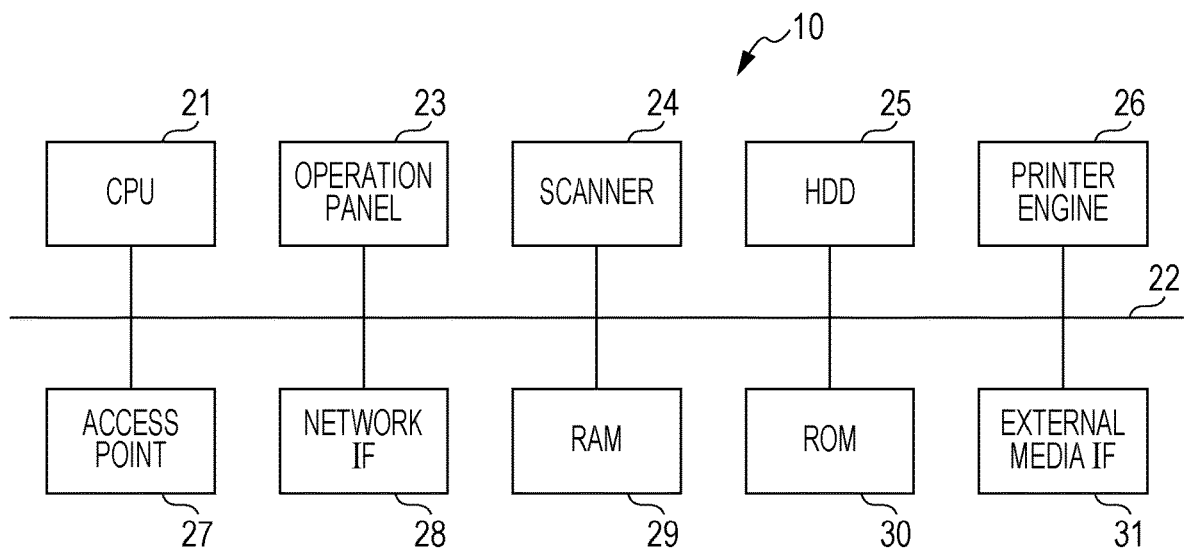

IMAGE FORMING APPARATUS, IMAGE FORMING METHOD, AND NON-TRANSITORY COMPUTER READABLE MEDIUM

CROSS-REFERENCE TO RELATED APPLICATIONS

This is a continuation of U.S. application Ser. No. 15/441,691, filed Feb. 24, 2017, which claims the benefit of Japanese Patent Application No. 2016-156390, filed Aug. 9, 2016, the entire contents of which are hereby incorporated by reference.

BACKGROUND

(i) Technical Field

The present invention relates to an image forming apparatus, an image forming method, and a non-transitory computer readable medium.

(ii) Related Art

The preview function is well known. With the preview function, preview images of a document that has been read by a scanner of a multifunction apparatus are instantly generated, and the preview images are displayed on an operation panel so that the preview images of the read document may be checked before printing.

SUMMARY

According to an aspect of the invention, there is provided an image forming apparatus including a display and a display controller. The display controller performs control in such a manner that a document-addition display component is displayed on the display together with all or some of reduced images of pages included in a first document, the document-addition display component being used for adding a second document to the first document.

BRIEF DESCRIPTION OF THE DRAWINGS

Exemplary embodiments of the present invention will be described in detail based on the following figures, wherein:

FIG. 1 is a block diagram illustrating the configuration of an image forming apparatus according to a first exemplary embodiment of the present invention;

FIG. 2 illustrates a hardware configuration of the image forming apparatus according to the first exemplary embodiment;

DETAILED DESCRIPTION

Figure 3:
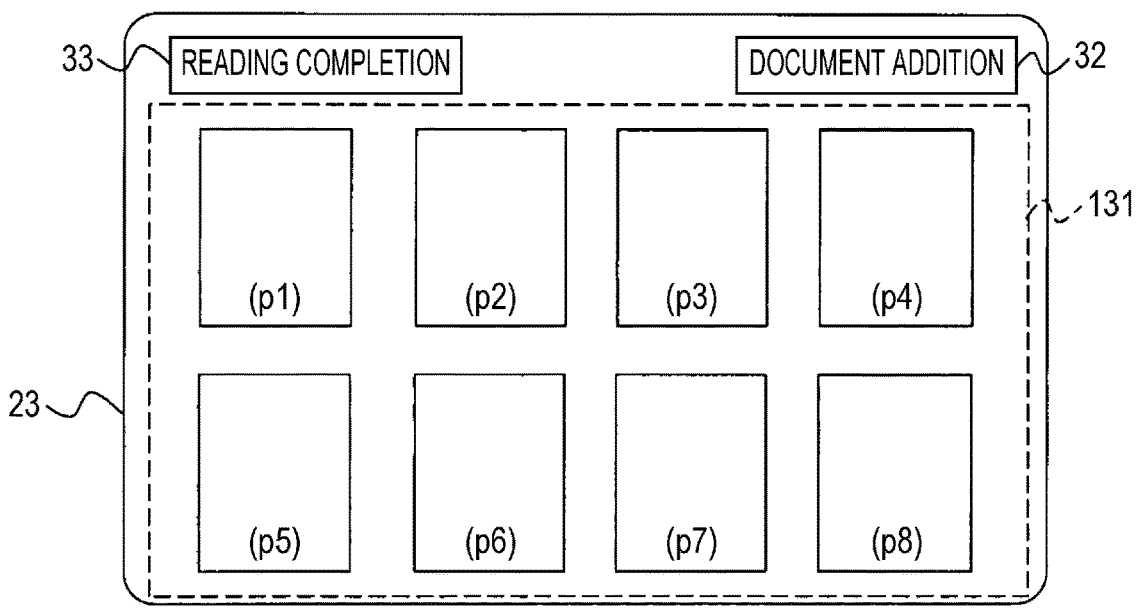
FIG. 3 illustrates an example of a preview screen displayed in the first exemplary embodiment.

Now, exemplary embodiments of the present invention will be described below with reference to the attached drawings.

First Exemplary Embodiment

FIG. 1 is a block diagram illustrating the configuration of an image forming apparatus according to an exemplary embodiment of the present invention. FIG. 2 illustrates a hardware configuration of an image forming apparatus 10 according to this exemplary embodiment. The image forming apparatus 10 is a multifunction apparatus having various functions such as a scan function, a copy function, and a print function and including a built-in computer. In FIG. 2, a central processing unit (CPU) 21 controls operations of various built-in mechanisms in the image forming apparatus 10, such as a scanner 24 and a printer engine 26, in accordance with programs stored in a read only memory (ROM) 30. An address data bus 22 communicates data by being connected to the various mechanisms, which are targets to be controlled by the CPU 21. An operation panel 23 is a user interface unit that serves as both an input unit that receives data or an instruction input by a user and a display that displays information. The scanner 24 reads a document placed by the user and causes, for example, a hard disk drive (HDD) 25 to store the read document as electronic data. The HDD 25 stores an electronic document and the like that are obtained by the reading of the scanner 24. The printer engine 26 prints an image on output paper in accordance with an instruction from a control program executed by the CPU 21. An access point 27 is a wireless communication unit having an access point function and wirelessly connects a mobile terminal such as a smartphone carried by a user by Wi-Fi Direct (registered trademark). A network interface (IF) 28 connects a network and is used for transmitting electronic data generated by the image forming apparatus 10, for receiving email transmitted to the image forming apparatus 10, for allowing access to the image forming apparatus 10 through a browser, and the like. A random access memory (RAM) 29 is used as a work memory at the time of executing a program or as a communication buffer at the time of transmitting and receiving electronic data. The ROM 30 stores various programs related to the control of the image forming apparatus 10 and the transmitting and receiving of electronic data. By the various programs being executed, each component that will be described later realizes a predetermined processing function. An external media interface (IF) 31 is an interface with an external memory device, such as a universal serial bus (USB) memory or a flash memory. The hardware configuration may be realized by using a traditional image forming apparatus 10.

Referring back to FIG. 1, the image forming apparatus 10 according to this exemplary embodiment includes a user interface (UI) processing unit 11, a scan-image obtaining unit 12, a preview-image generating unit 13, a page adding unit 14, an execution controlling unit 15, and a document storing unit 16. The user interface processing unit 11 functions as a display controller that receives data and an operation instruction input through operation on the operation panel 23 and that controls the displaying of various types of information including preview images on the operation panel 23. The scan-image obtaining unit 12 obtains a read image of a document that has been read by the scanner 24, and the image is stored in the document storing unit 16.

The preview-image generating unit 13 generates reduced images of the read image of the document. The page adding unit 14 performs a process for adding, to the previously read document (first document), a document (second document) for which the user inputs an adding instruction. The execution controlling unit 15 functions as an execution controller that controls the execution of processes in the image forming apparatus 10, such as a document adding process performed by the page adding unit 14 and a generating and displaying process of preview images.

Each of the user interface processing unit 11, the scan-image obtaining unit 12, the preview-image generating unit 13, the page adding unit 14, and the execution controlling unit 15 in the image forming apparatus 10 is realized by cooperation between a computer included in the image forming apparatus 10 and a program operating on the CPU 21 included in the computer. In addition, the document storing unit 16 is realized by the HDD 25 included in the image forming apparatus 10. Alternatively, it is possible to use the RAM 29 or an external storing unit via a network.

It is needless to say that programs used in this exemplary embodiment may be provided from a communication unit or may be provided by being stored in a computer readable recording medium, such as a compact-disc (CD)-ROM or a USB memory. The programs provided from the communication unit or the recording medium are installed in a computer, and the CPU of the computer sequentially executes the programs, thereby performing various processes.

A feature of this exemplary embodiment is that a document-addition display component for adding a document to a read document is displayed together with preview images on a preview screen on which all of the preview images of the pages included in the read document is displayed. Thus, a user is capable of inputting an instruction for adding a document by selecting the document-addition display component on the preview screen. Accordingly, the user is capable of adding the document while checking the preview images without closing the preview screen. Now, operations in the exemplary embodiment will be described.

If the user places a document including multiple pages on a scanner platen (not illustrated) of the image forming apparatus 10 and pushes a scan start button on a menu screen displayed on the operation panel 23, the scanner 24 starts scanning and reading the document. In accordance with the reading of the document by the scanner 24, the scan-image obtaining unit 12 causes the document storing unit 16 to store the read image.

Upon the document storing unit 16 storing the read image of the document, the preview-image generating unit 13 generates preview images of the pages included in the document that has been read. Then, the user interface processing unit 11 generates a preview screen for displaying the generated preview images and causes the preview screen to be displayed on the operation panel 23.

FIG. 3 illustrates an example of the preview screen displayed on the operation panel 23 in this exemplary embodiment. Above a display region 31 of the preview images on the preview screen, a document-addition button 32, which corresponds to the above-described document-addition display component, is displayed. Although this exemplary embodiment describes an example in which a list of all pages (eight pages) included in the document is displayed in the display region 31, if the list of all pages is not displayable, for example, by displaying a scroll button or receiving a swipe operation if the operation panel 23 is a touchscreen, a list of some pages may be scrolled. A traditional technology may directly be used for displaying and scrolling the preview images.

If the user wishes to add a document (hereinafter referred to as an "additional document") to the document (hereinafter referred to as a "read document") whose preview images are being displayed, the user places the additional document on the scanner platen and performs a predetermined operation, such as pushing, on the document-addition button 32, and thereby inputting an instruction for adding the document. Upon the scanner 24 reading the additional document in response to this instructing operation, the scan-image obtaining unit 12 causes the document storing unit 16 to store a read image of the additional document as in the above description. Then, the page adding unit 14 adds each page of the additional document following the last page of the read document. In this manner, the additional document is automatically added to the read document, and the preview images of the read document after the additional document has been added are displayed on the operation panel 23 as in the above description.

As described above, this exemplary embodiment makes it possible for the user to input the instruction for adding the document while checking the preview images of the read document without closing the preview screen.

Note that the additional document that has been read is then included in the read document. That is, for example, if an additional document of two pages is added to a read document of eight pages, a read document of ten pages is obtained and displayed on the preview screen. An additional document may further be added to the read document of ten pages. For example, if an additional document of four pages to be added to the read document of ten pages, which has been obtained by adding two pages, is placed on the scanner platen and the document-addition button 32 is pushed, a read document of 14 pages is obtained and displayed on the preview screen.

In addition, a reading completion button 33 is provided above the display region 31 in addition to the document-addition button 32 in FIG. 3. The document-addition button 32 is a graphical user interface (GUI) for receiving an instruction for adding an additional document to a read document that is being displayed in the display region 31 of preview images, whereas the reading completion button 33 provided as a document-reading-completion display component is a GUI for receiving an instruction for completing adding of the document. In other words, the reading completion button 33 is a GUI for the user to inform the image forming apparatus 10 of the completion of reading the document by the scanner 24 in order to add the document to the read document. In response to operation of the reading completion button 33, the addition of the document to the read document is completed at this time. In this exemplary embodiment, a user operation of pushing the reading completion button 33 also causes the displaying of the preview screen to be completed, and in accordance with the user operation, a predetermined screen, such as a menu screen, is displayed on the operation panel 23.

Second Exemplary Embodiment

Figure 4:
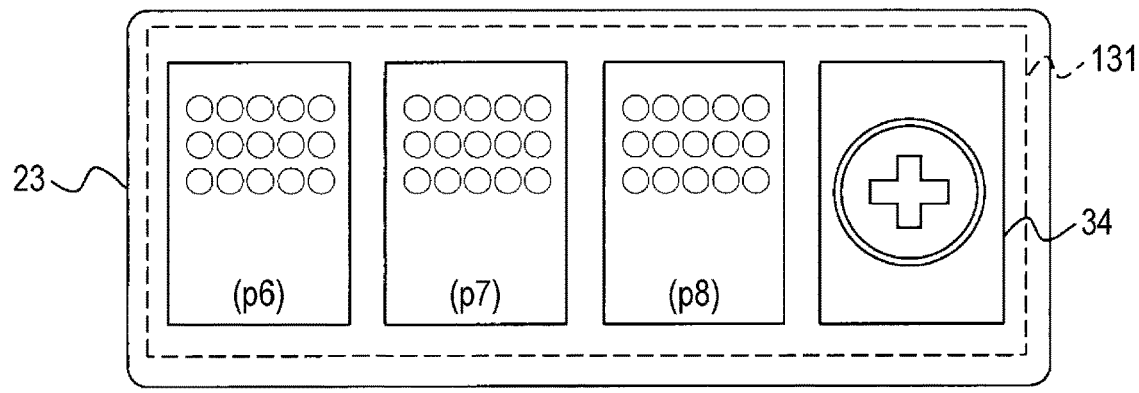
FIG. 4 illustrates an example of the preview screen displayed in a second exemplary embodiment.

FIG. 4 illustrates an example of the preview screen displayed on the operation panel 23 in this exemplary embodiment. Note that the image forming apparatus 10 in this exemplary embodiment has the same or substantially the same hardware configuration and block configuration as the image forming apparatus 10 in the first exemplary embodiment, and therefore description thereof is omitted. The same applies to the following exemplary embodiments.

In the first exemplary embodiment above, the document-addition button 32 is displayed outside the display region (above the display region 31 in FIG. 3) of the preview images. However, a feature of this exemplary embodiment is that the document-addition button 32 is displayed within the display region 31 of the preview images.

If the size of each preview image is relatively increased, the content of the page is easy to observe. On the other hand, if the display region 31 of the preview images is increased, sufficient room for displaying the document-addition button 32 might not be provided. In recent years, there have been cases where it has not been possible to display the document-addition button 32 without increasing the display region 31 of the preview images due to insufficient room when a mobile terminal such as a smartphone has been used as a user interface of the image forming apparatus 10, depending on the screen size or shape of the mobile terminal. Accordingly, in this exemplary embodiment, the document-addition button 32 is displayed within the display region 31 of the preview images.

As illustrated in FIG. 4, since it is not possible to display all of the pages of the document in the display region 31 at a time, the user causes preview images of some pages that the user wishes to check to be displayed by scrolling. Note that the scrolling may be performed by a swipe operation on the display region 31. FIG. 4 illustrates an example in which a document-addition button 34 is displayed following the last page of the read document. Although the document-addition button 34 is generated and displayed with the same size and shape as each preview image of a page in this exemplary embodiment, the size and shape are not limited to those examples. For example, the document-addition button 34 having a smaller width may be generated in order to provide sufficient room for displaying the preview images.

In addition, although FIG. 4 illustrates a case where the display region 31 on the operation panel 23 is horizontally long and the preview images are horizontally scrolled, the operation panel 23 may be vertically long. In this case, the preview images may be vertically scrolled, and the document-addition button 34 may be displayed below the preview images. By generating and displaying the document-addition button 34 in this manner, the preview images as large as possible are displayed in the display region 31.

If the user wishes to add a document, the user scrolls the preview images and causes the document-addition button 34 immediately after the last page of the read document to be displayed as illustrated in FIG. 4. If the read document has a large number of pages, since the scrolling takes time, a button for skipping to the rightmost page (the last page of the read document) may be provided and displayed on the operation panel 23. Then, upon the user selecting the document-addition button 34, the page adding unit 14 adds the pages included in the additional document following the last page of the read document. Note that the process for adding the document may be the same or substantially the same as that in the first exemplary embodiment, and therefore description thereof is omitted.

Note that although the document-addition button 34 is displayed immediately after the last page of the read document in this exemplary embodiment, the display position is not limited to this position as long as it is within the display region 31 of the preview images. The document-addition button 34 may be displayed in front of the preview images or between preview images.

In FIG. 4, the document-addition button 34 is displayed immediately after the last page of the read document, so that the additional document is added following the last page. For example, if an additional document of two pages is added to a read document of eight pages, the two pages of the additional document become pages 9 and 10 of the read document. In contrast, the document-addition button 34 may be displayed immediately before the front page of the read document, so that the additional document may be added before the front page. For example, if an additional document of two pages is added to a read document of eight pages, the two pages of the additional document become pages 1 and 2 of the read document, and the eight pages of the read document become pages 3 to 10.

Note that the reading completion button 33 may be displayed within the display region 31 of the preview images in a form different from the document-addition button 34.

Third Exemplary Embodiment

Each of the above exemplary embodiments has been described on the assumption that a pushing operation (tap operation) is basically performed on a document-addition button. A feature of this exemplary embodiment is performing a process in accordance with a manner in which the user has operated the document-addition button.

For example, the same screen as the screen illustrated in FIG. 4 in the second exemplary embodiment may be initially displayed. Then, as in the second exemplary embodiment, the user inputs an instruction for adding a document by tapping the document-addition button 34. This process may be the same or substantially the same as that in the second exemplary embodiment, and therefore description thereof is omitted.

Figure 5:
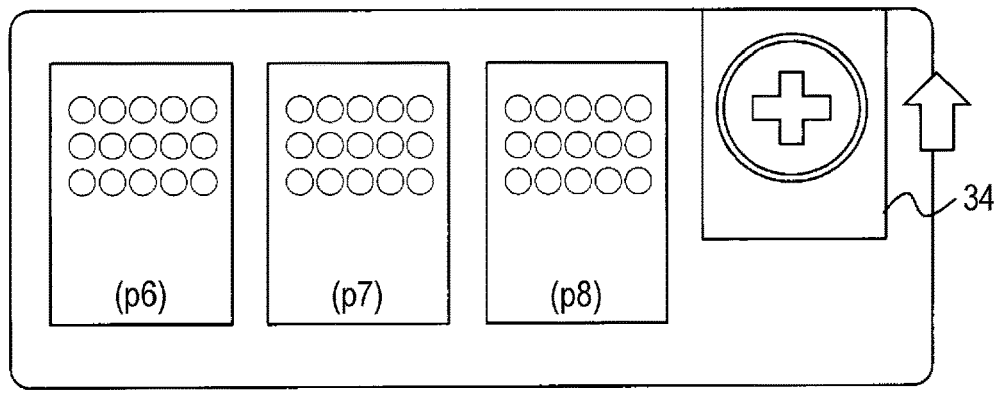
FIG. 5 illustrates an example of the preview screen displayed in a third exemplary embodiment.

Then, by swiping out the document-addition button 34 upwards as indicated by the arrow in FIG. 5, the user inputs an instruction for completing reading of the document. Upon detecting the user operation performed in this manner, the execution controlling unit 15 recognizes the completion of reading of the document. Accordingly, a predetermined screen, such as a menu screen, is displayed on the operation panel 23 as described in the first exemplary embodiment. In this manner, the reading completion button described in the first exemplary embodiment is unnecessary in this exemplary embodiment. In other words, the document-addition button 34 also serves as the reading completion button in this exemplary embodiment.

Figure 6:
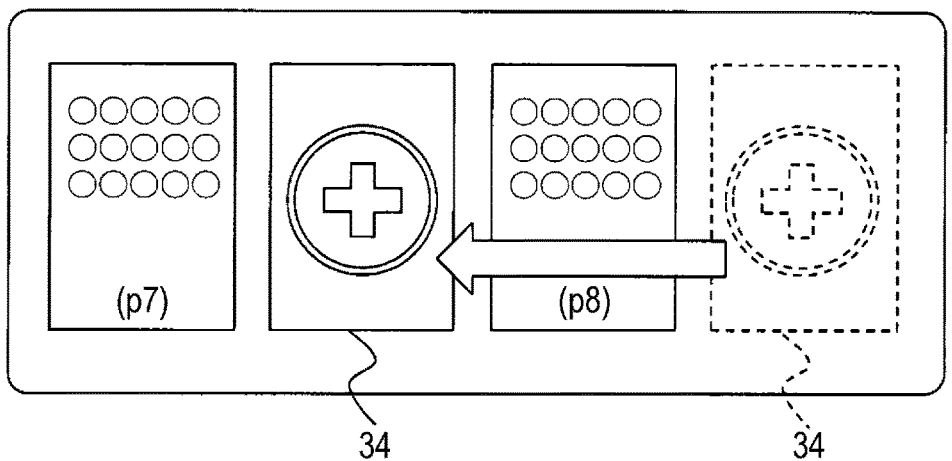
FIG. 6 illustrates another example of the preview screen displayed in the third exemplary embodiment.

In addition, as illustrated in FIG. 6, the document-addition button 34 displayed immediately after the last page is drag-and-dropped at the position where a document is to be added (between page 7 and page 8 in FIG. 6). Thus, the execution controlling unit 15 instructs the page adding unit 14 to add an additional document between pages specified by the user.

According to this exemplary embodiment, by receiving user operations performed in different manners on the document-addition button 34, another GUI is not necessarily provided. Accordingly, it is possible to provide sufficient room for displaying the preview images.

Note that in this exemplary embodiment, since different processes are performed depending on the user operation on the single document-addition button 34, in order to prevent an unintended process from being performed as a result of an erroneous operation, a screen for confirming the content of the process may be displayed on the operation panel 23 after operating the document-addition button 34.

Fourth Exemplary Embodiment

Figure 7:
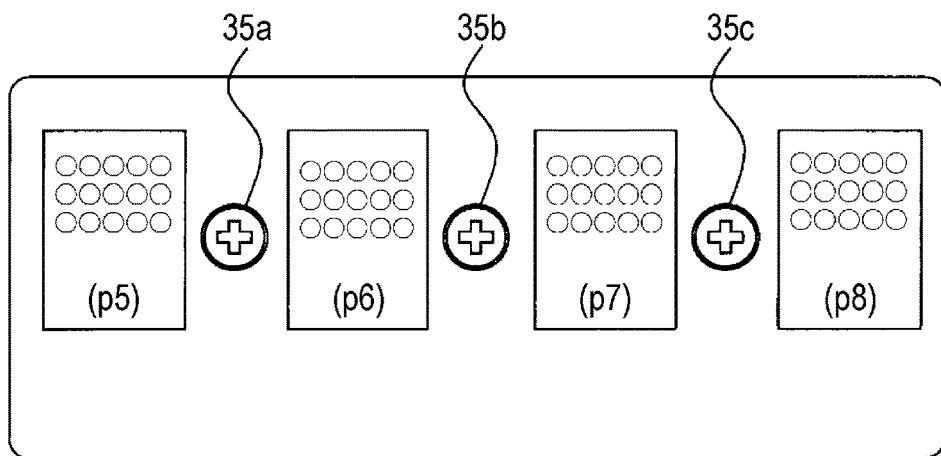
FIG. 7 illustrates an example of the preview screen displayed in a fourth exemplary embodiment.

In each of the above exemplary embodiments, only the single document-addition button is displayed, and the additional document is added at the position where the document-addition button is displayed. In this exemplary embodiment, the user interface processing unit 11 causes a document-addition button to be displayed in each gap between the preview images displayed on the operation panel 23. In addition, the execution controlling unit 15 causes the page adding unit 14 to perform a process for adding an additional document at a position of the read document corresponding to the display position of a document-addition button operated by the user. FIG. 7 illustrates an example of the preview screen displayed in this exemplary embodiment. As illustrated in FIG. 7, document-addition buttons 35a, 35b, and 35c are each displayed in a gap between the preview images.

Figure 8:
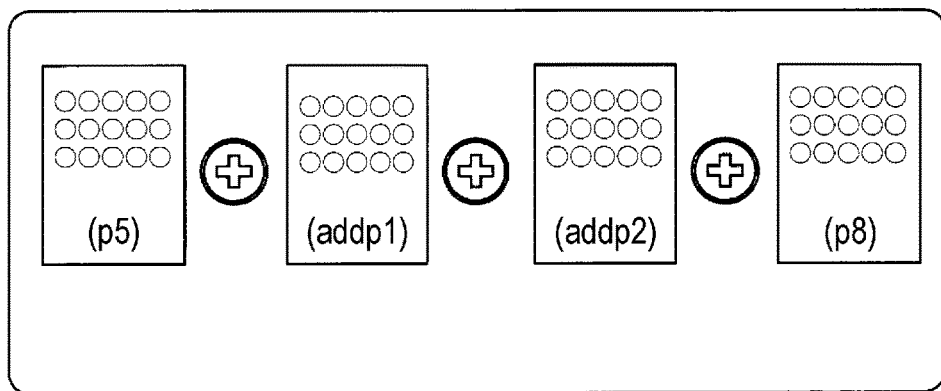
FIG. 8 illustrates an example of the preview screen displayed after the addition of a document in the fourth exemplary embodiment.

If the user places an additional document on the scanner platen and pushes the document-addition button 35c on the preview screen, the page adding unit 14 adds the additional document at the position corresponding to the display position of the document-addition button 35c. FIG. 8 illustrates an example of the preview screen displayed after the addition. From the example in FIG. 8, it is understood that the additional document includes two pages. Although the pages are not renumbered so as to be easily compared with those in FIG. 7, by the addition of the document, pages 1 and 2 of the additional document become pages 8 and 9 of the read document, and page 8 of the read document before the addition becomes page 10.

Note that if the additional document includes multiple pages to be added at multiple positions, the number of pages to be added may be specified for each selected document-addition button.

Note that each of the above exemplary embodiments has described as an example a case where preview images of the read image of the document obtained by the scanner 24 are displayed on the preview screen. However, display targets on the preview screen are not necessarily limited to the scan image and may be an image stored in the HDD 25, an image obtained from the outside via a network, and an image obtained from an external memory device. In addition, preview images may be displayed on the preview screen by combining multiple exemplary embodiments described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a display; and
a processor programmed to:
perform control to display multiple document-addition display components that are formed on the display together with all or some of reduced images of pages included in a first document, each of the multiple document-addition display components being formed between adjacent ones of the reduced images of pages included in the first document, wherein:
each of the multiple document-addition display components is a separate user interface individually operable by a user to add a second document to the first document, such that
different ones of the multiple document-addition display components are instructed to add different pages of the second document, and
after the different pages of the second document are added by the different ones of the multiple document-addition display components, display additional multiple document-addition display components between every adjacent reduced images of the added pages of the second document.

2. The image processing apparatus according to claim 1, wherein the processor is programmed to:
specify a number of pages in the second document to be added by each of the multiple document-addition display components.

3. The image processing apparatus according to claim 1, wherein the processor is programmed to:
in response to a first user gesture on a respective one of the multiple document-addition display components, add the second document; and
in response to a second user gesture different from the first user gesture on the respective document-addition display component, complete reading of the second document and change a display screen so that the multiple document-addition display components are not displayed.

4. The image forming apparatus according to claim 1, wherein the multiple document-addition display components are displayed in a display region of the reduced images so as to be scrolled together.

5. The image forming apparatus according to claim 1, wherein the processor is programmed to:
control execution of a process in accordance with a manner in which the user has operated the multiple document-addition display components.

6. The image forming apparatus according to claim 1, wherein the processor is programmed to:
display a document-reading-completion display component together with the multiple document-addition display components, the document-reading-completion display component being used to complete reading of the second document that is added to the first document.

7. The image forming apparatus according to claim 1, wherein the second document is added to the first document at a position corresponding to a display position of one or more selected ones of the multiple document-addition display components operated by the user.

8. An image forming method comprising:
performing control to display multiple document-addition display components that are formed on a display together with all or some of reduced images of pages included in a first document, each of the multiple document-addition display components being formed between adjacent ones of the reduced images of pages included in the first document, wherein:

each of the multiple document-addition display components is a separate user interface individually operable by a user to add a second document to the first document, such that different ones of the multiple document-addition display components are instructed to add different pages of the second document, and after the different pages of the second document are added by the different ones of the multiple document-addition display components, display additional multiple document-addition display components between every adjacent reduced images of the added pages of the second document.

9. A non-transitory computer readable medium storing a program causing a computer to execute a process for image formation, the process comprising:

performing control to display multiple document-addition display components that are formed on a display together with all or some of reduced images of pages included in a first document, each of the multiple document-addition display components being formed between adjacent ones of the reduced images of pages included in the first document, wherein:

each of the multiple document-addition display components is a separate user interface individually operable by a user to add a second document to the first document, such that different ones of the multiple document-addition display components are instructed to add different pages of the second document, and after the different pages of the second document are added by the different ones of the multiple document-addition display components, display additional multiple document-addition display components between every adjacent reduced images of the added pages of the second document.

* * * * *